C. V. BEEBE.
AUTOMOBILE TOP.
APPLICATION FILED JUNE 25, 1912.

1,079,205.

Patented Nov. 18, 1913.
3 SHEETS—SHEET 1.

WITNESSES
Frank C. Palmer

INVENTOR
Carl V. Beebe
BY
ATTORNEYS

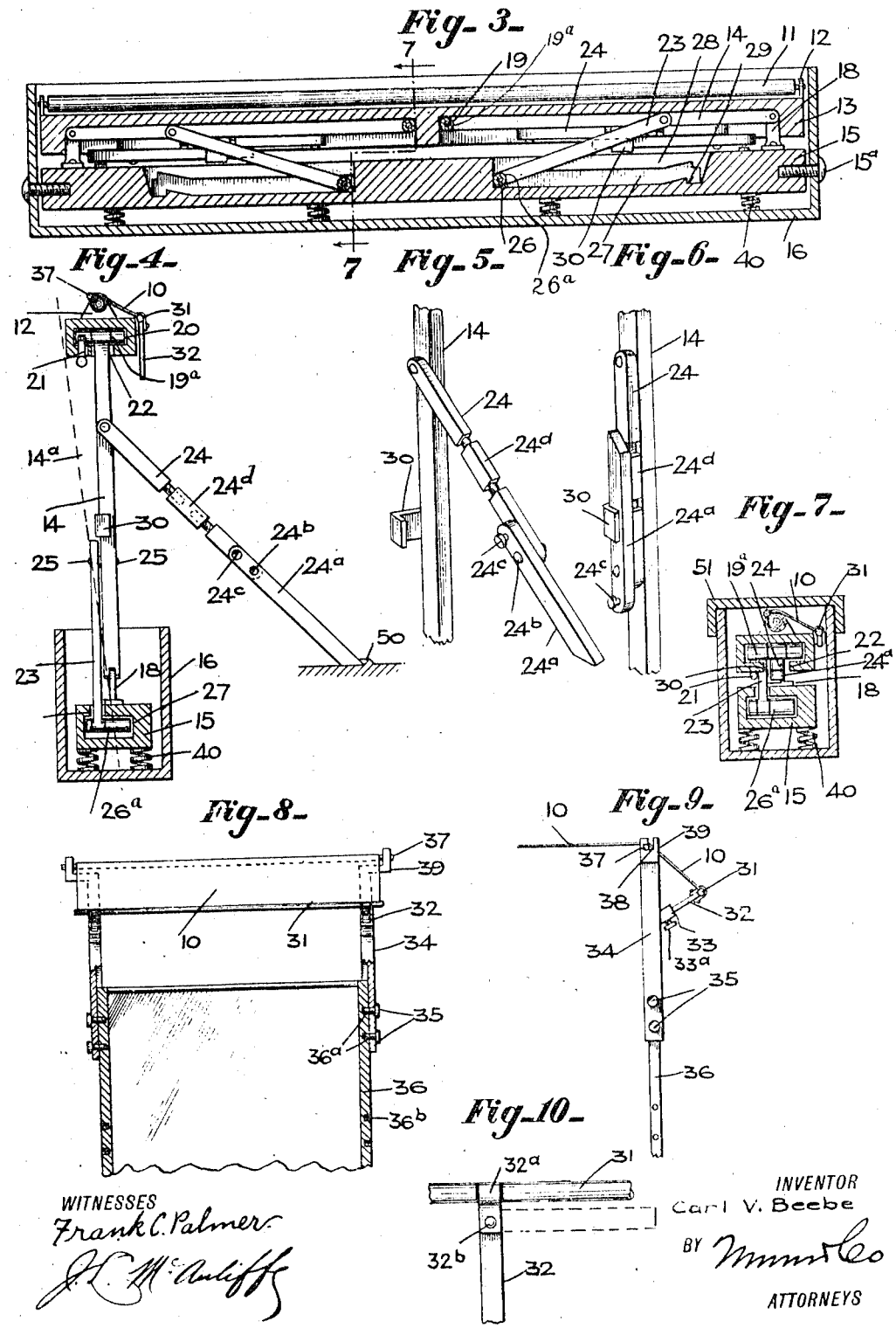

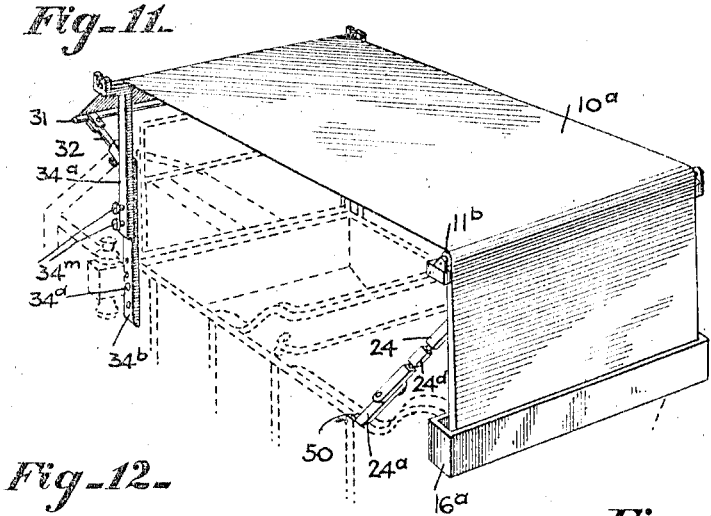
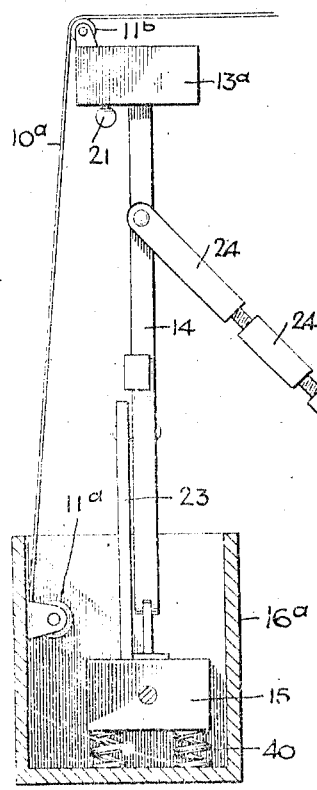
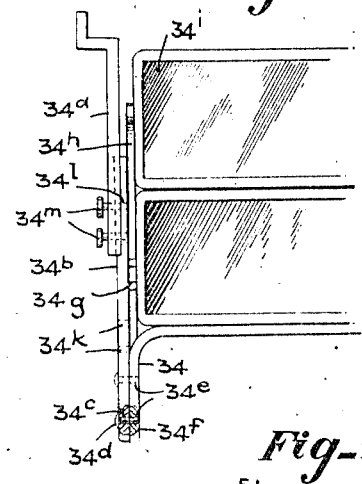
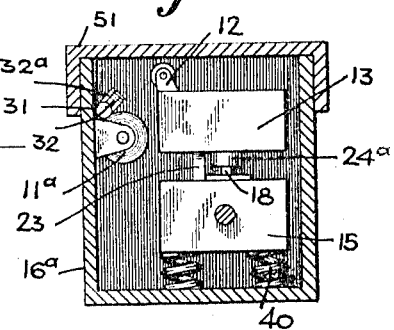

UNITED STATES PATENT OFFICE.

CARL V. BEEBE, OF MOUNT GILEAD, OHIO.

AUTOMOBILE-TOP.

1,079,265.

Specification of Letters Patent.

Patented Nov. 18, 1913.

Application filed June 25, 1912. Serial No. 705,733.

*To all whom it may concern:*

Be it known that I, CARL V. BEEBE, a citizen of the United States, and a resident of Mount Gilead, in the county of Morrow and State of Ohio, have invented a new and Improved Automobile-Top, of which the following is a full, clear, and exact description.

My invention relates to automobile tops comprising a canopy or curtain, and means for securing the curtain in position or for storing it when not required for use.

An object of my invention is to provide a top of the indicated character, which can be placed in position with convenience and despatch, and quickly and conveniently lowered and stored into small compass when not required for use.

The distinguishing features of my invention, and the important structural elements characterizing the preferred embodiment which is illustrated as an example, will be more particularly explained in the specific description hereinafter to be given.

Reference is to be had to the accompanying drawings forming a part of this specification, in which similar characters of reference indicate corresponding parts in all the views.

Figure 1:
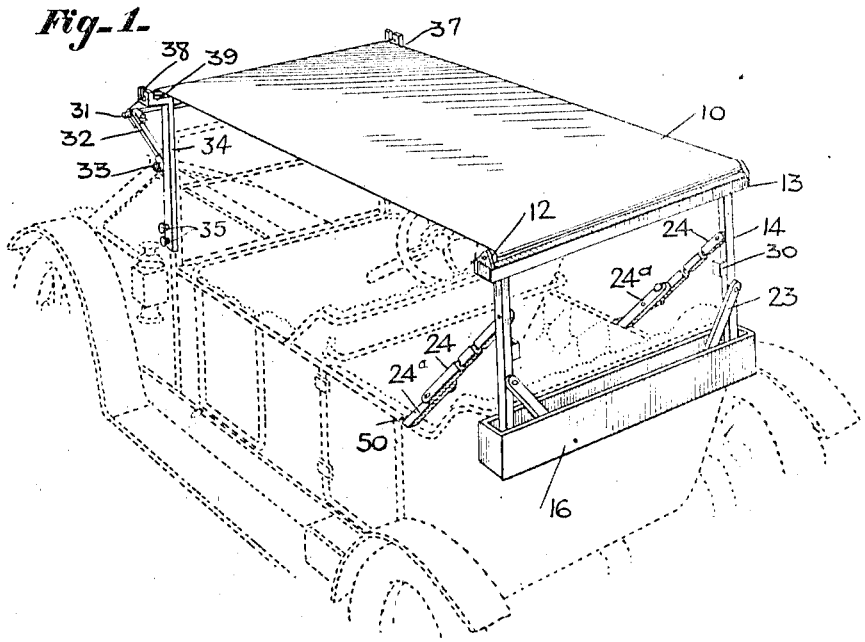
Figure 2:
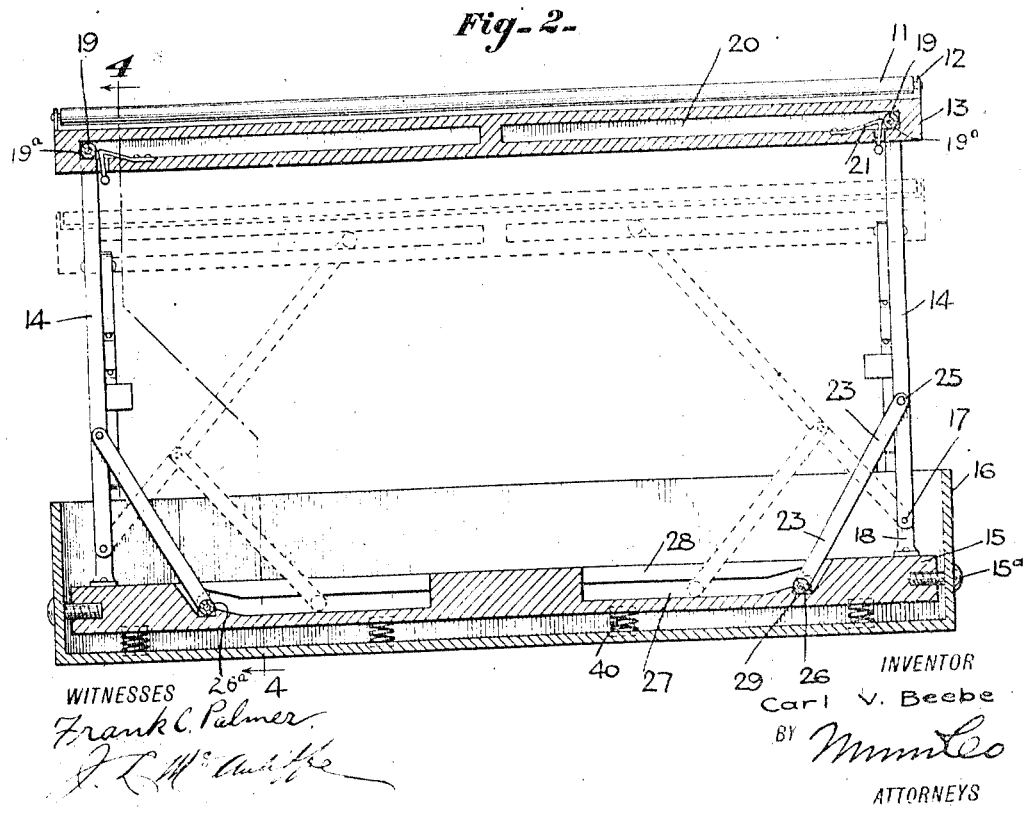

Figure 1 is a perspective view showing my improved automobile top and its appurtenances set up in position for use, part of an automobile being indicated in dotted lines; Fig. 2 is a sectional rear elevation with the top supports in the erect position; Fig. 3 is a similar view with the top supports lowered and stored in their containing case; Fig. 4 is a cross section taken on about the line 4—4 of Fig. 2; Fig. 5 is a fragmentary perspective view of one of the brace arms for the rear supporting standards of the top, showing said arms in the extended position; Fig. 6 is a similar view showing the brace arm folded against the standard; Fig. 7 is a cross section on approximately the line 7—7 in Fig. 3; Fig. 8 is a fragmentary front view, partly in section, showing the manner of supporting the front end of the curtain or canopy from the wind shield; Fig. 9 is a side elevation of parts shown in Fig. 8; Fig. 10 is a fragmentary detail view of the means for securing the front edge of the curtain or canopy to the front standards carried by the wind shield; Fig. 11 is a perspective view illustrating a slight modification of the manner of securing the rear end of the curtain and its spring roller, and a slightly different mode of securing the front standards; Fig. 12 is a fragmentary side elevation, partly in section, of the modified arrangement of the spring roller with the curtain in use; Fig. 13 is a cross section similar to Fig. 7, showing the modified arrangement with the curtain and its rear supports inclosed in a case; and Fig. 14 is a fragmentary elevation showing the modified arrangement of the front standards.

In constructing a canopy or vehicle top and its appurtenances in accordance with the particular illustrated embodiment of my invention, the curtain or canopy 10 is secured at one end to a roller 11, said roller being of any approved form of spring roller similar to that of a window shade, and being suitably journaled in brackets 12, that project upward from a top cross bar 13. The bar 13 and the roller 11 carried thereon are supported on standards 14 that are secured to a base 15 in a manner to fold as hereinafter described, and the said base 15 is arranged in a case 16, which in practice is secured at the back of an automobile or other vehicle in any suitable way. The lower ends of the standards are pivoted in the form shown, as at 17, to vertical brackets 18 on the upper side of the base 15 to swing inwardly toward each other, and at the upper ends the standards 14 have T-heads 19, that are adapted to slide in the longitudinal chambers 20 of the top bar 13. In the outer position, as when the standards 14 are erect, they are held by spring catches 21, shown clearly in Fig. 2. In the shifting of the T-heads 19 inward toward the center of the bar 13, the standard 14 moves in a vertical slot 22 formed in the bottom of the bar 13 and communicating with the chamber 20, as shown in Fig. 4. At the bottom, the standards 14 are provided with laterally extending braces 23 and with forwardly extending braces 24, the braces 23 being pivoted as at 25 to the standards, and at the lower end said braces are provided with T-heads 26 that slide in a chamber 27 ranging lengthwise of the base 15. The base has also a longitudinal slot 28 in the top communicating with the longitudinal chamber 27 for the movement of the brace 23.

When the standards are erect, as in Figs. 1 and 2, the braces 23 engage against a locking shoulder 29 formed in each chamber 27 near the outer end thereof. The forwardly extending braces 24 for the standards 14 are formed in hinged sections, the outer end 24$^a$ being pivoted as at 24$^b$ and provided with a set screw or locking pin 24$^c$ for holding the front section in extended form, as in Fig. 5, or in the folded position, as in Fig. 6. Each standard is provided with an angle iron 30 against which the folded brace arm 24 brings up when the standards are to be lowered. Desirably, the braces 24 are provided with a turnbuckle 24$^d$ for adjusting the length.

The free end of the curtain or canopy 10 is provided with a cross bar or rod 31, which carries near its end the pivoted fastening arms 32, the said arms being mounted to swing on the bar 31 to engage in sockets 33 provided on the front edge of standards 34. The sockets 33 are preferably formed integral with the standards 34, and may be provided with set screws 33$^a$ to bind the arms 32. The standards 34 in the construction illustrated in Figs. 1 to 10, are secured by set screws 35 to the windshield frame 36, which is formed with upper and lower sets of screw holes 36$^a$, 36$^b$. When the curtain is not in use the standards 34 may be lowered and secured by the set screws 35 taking into the lower set of holes 36$^b$, while when the curtain is in use, the standards 34 are raised, the set screws 35 taking into the holes 36$^a$. The arms 32 are secured to the bar 31 to swing in two directions; thus the straps 32$^a$ that secure the said arms to the bar may swing on the said bar, and the arms 32 may swing also on the pivots 32$^b$ which secure the arms to the straps 32$^a$, so that the arms 32 may assume a position at approximately right angles to the bar 31, to engage the sockets 33 or to fold parallel with the bar 31, as indicated by dotted lines in Fig. 10.

In the form illustrated in Figs. 11 and 14, the standard 34$^a$ instead of being secured to the wind shield, may be secured to an upright 34$^b$, which is formed with screw holes 34$^c$ for receiving screws 34$^d$. The screws 34$^d$ are adapted also to take into screw holes 34$^e$ formed in the body portion 34$^f$, whereby the upright 34$^b$ will be supported from the body. If desired, screw holes 34$^g$ may be formed also in the frame member 34$^h$ of the shield 34$^i$. Thus the screws 34$^d$ may be employed to secure the upright 34$^b$ either to the body portion 34$^f$, or to the shield frame member 34$^h$. The upright 34$^b$ is provided with a lower set of holes 34$^k$, and an upper set of holes 34$^l$, and screws 34$^m$ may secure the standards 34$^a$ in the upper position shown in Fig. 14 when the curtain 10 or the curtain 10$^a$, hereinafter referred to, is to be used, or the said screws 34$^m$ may take into the lower holes 34$^k$ and maintain the standards 34$^a$ in the lowered position when the top 10 or 10$^a$ is not in use.

At a point rearward from the front edge of the curtain, a short distance from the end of the curtain, a second bar 31, the curtain is provided with a second rod 37, the ends of which project sufficiently beyond the curtain to engage in bayonet slots 38 formed in outwardly offset members 39 of the standards 34, as shown clearly in Figs. 8 and 9. The described attachments at the front of the curtain, give that end of the curtain a front hood extension.

It is desirable to put tension on the curtain and on the rear standards 14, and for this purpose I mount the base 15 in the case 16 on two longitudinal series of springs 40, so that the said base 15, and with it the standards 14, and the top bar 13, may be tilted rearwardly, for instance to a position indicated by the dotted lines 14$^a$ in Fig. 4. The base 15 rocks on pivots 15$^a$, and the springs 40 accommodate themselves to the movements of the base 15 on the said pivots.

Instead of securing the curtain or top to a spring roller mounted on the bar 13, I may mount a spring roller 11$^a$ in the case 16$^a$, as shown in Figs. 11, 12 and 13, and on the bar 13$^a$ an elongated idler roller 11$^b$ may be mounted to guide the curtain top 10$^a$.

With the described construction, it will be evident that the top bar 13 may be raised from the position shown in Fig. 3 to that shown in Fig. 2, the latter figure indicating by dotted lines the parts in position intermediate between the case 16 and the fully raised position indicated in full lines. In the movement of the parts from the lower to the raised position, and vice versa, the T-heads 19 of the rear standards will slide in the chamber 20 and finally be engaged by the springs 21. The lateral braces 23 in the meantime will slide in the chamber 27 and finally engage behind the shoulders 29. When the rear standards are in the erect position, the curtain or canopy 10 is drawn forwardly from the spring roller 11 to the front of the automobile, as indicated in Figs. 1, 8 and 9, the bars 37 being engaged in the opposite bayonet slots 38 of the front standards 34, and the fastening arms 32 on the bar 31 being engaged in the sockets 33. After bars 31 and 37 are in their respective positions, roller 11 is locked to prevent further turning. The forwardly extending braces 24 on the rear bars are now manipulated so that the lower forward ends of said braces engage behind the overhanging lugs 50 provided on the top of the automobile, or said lower ends of the braces are fastened in any suitable manner. By operating the turnbuckles 24ᵈ, after the forward ends of the braces 24 have been engaged with the lugs 50, the standards 14 are forced rearwardly from the perpendicular to the inclined position indicated by the dotted line 14ᵃ, Fig. 4, thus putting tension on the curtain 10 and holding the bar 37 in proper position in the bayonet slots 38.

When the automobile top is not required for use the holding arms 32 are released from the sockets, the bar 37 is disengaged from the upper end of the front standards 34, so that the curtain will be taken by the spring roller 11 or 11ᵃ, to the position shown in Fig. 4. The forward brace arms 24 are now released at the lower ends, and folded into the position shown in Fig. 6, whereupon the top bar 13, carrying the rolled-up curtain is lowered by pressing the standards 14 inwardly toward each other and lowering the top bar of the standards and their appurtenances to the position shown in Figs. 3 and 7, so that all the parts are folded within the case 16, after which any suitable dust-proof cover 51 is placed upon the case. In practice the T-heads 19 and 26 may have friction rollers 19ᵃ, 26ᵃ thereon.

While my invention is primarily intended for use in connection with automobiles, it will be understood that it may be employed in connection with other vehicles. It is obvious, also, that minor mechanical details may be varied without departing from the spirit of my invention; thus, for instance, any equivalent means can be employed in lieu of the spring catches 21 and the shoulder 29. It is clear also that the bar 13 or 13ᵃ with the roller 11 or 11ᵇ, carries or supports the curtain at the rear end of the vehicle.

Having thus described my invention, I claim as new and desire to secure by Letters Patent,—

1. A curtain-carrying means for automobiles and other vehicles comprising a case, a base therein, standards carried by the base and foldable longitudinally of the base toward and from each other from a position within the case to an erect position, and a curtain-carrying device with which the upper ends of the said standards have transverse sliding engagement.

2. In a top for automobiles and other vehicles, a spring-supported base, a curtain bar, foldable means connecting said base and curtain bar to raise and lower said bar, and braces for said foldable means.

3. In a top for automobiles and other vehicles, a spring-supported base, a curtain bar, and foldable members connecting said base and curtain bar to raise and lower said bar.

4. In a top for automobiles and other vehicles, a curtain-carrying bar, a receiving case for said curtain bar, standards having support within the case at their lower ends, and having movable connection with the curtain bar at their opposite ends, the standards being foldable from a substantially horizontal position to an erect position to carry the curtain bar downward within the case or upward to the opposite position, and braces pivotally connected with the standards at one end and having guided movement at their lower ends within the case.

5. In a top for automobiles and other vehicles, a curtain bar, standards provided with heads having sliding connection with the curtain bar, catches on the curtain bar for holding the standards in the erect position, means pivotally supporting the lower ends of the standards, and foldable means for sustaining the standards in erect position.

6. In a top for automobiles and other vehicles, a case, a base within said case and formed with guides running longitudinally thereof, standards pivoted to the base at their lower ends, braces pivoted to the standards at one end and movable at their other ends in the mentioned guides of the base, and a curtain bar with which the said standards have sliding engagement at their upper ends.

7. A top for automobiles and other vehicles, comprising a curtain, a roller for the curtain, a bar carrying said roller, a case, foldable means for supporting the said curtain bar from the case, and means for supporting the front end of the curtain and comprising members attachable to a shield, members carried by the free end of the curtain for engagement with the members attachable to the shield, and additional members carried by the curtain rearward of the front edge for engagement with the said members attachable to the shield.

8. A top for automobiles and other vehicles, comprising a curtain, a roller for the curtain, a bar carrying said roller, a case, foldable means for supporting the said bar from the case, and means for supporting the front end of the curtain and comprising uprights, means for securing said uprights in position on the vehicle, members carried by the free end of the curtain for engagement with the said uprights, and additional members carried by the curtain rearward of the front edge for engagement with the said uprights.

9. A top for automobiles and other vehicles, comprising a curtain, means for securing the rear end of the curtain, and means for engaging the front end of the curtain, said latter means comprising uprights, means for securing said uprights in position on the vehicle, standards attachable to said uprights, and means for engaging the front end of the curtain with said standards.

In testimony whereof I have signed my name to this specification in the presence of two subscribing witnesses.

CARL V. BEEBE.

Witnesses:
W. G. BEEBE,
M. R. BEEBE.